March 8, 1966  W. D. BOHANNON, JR  3,239,396
METHODS OF AND APPARATUS FOR LAMINATING ELONGATED MEMBERS
Filed Feb. 2, 1962  3 Sheets-Sheet 1
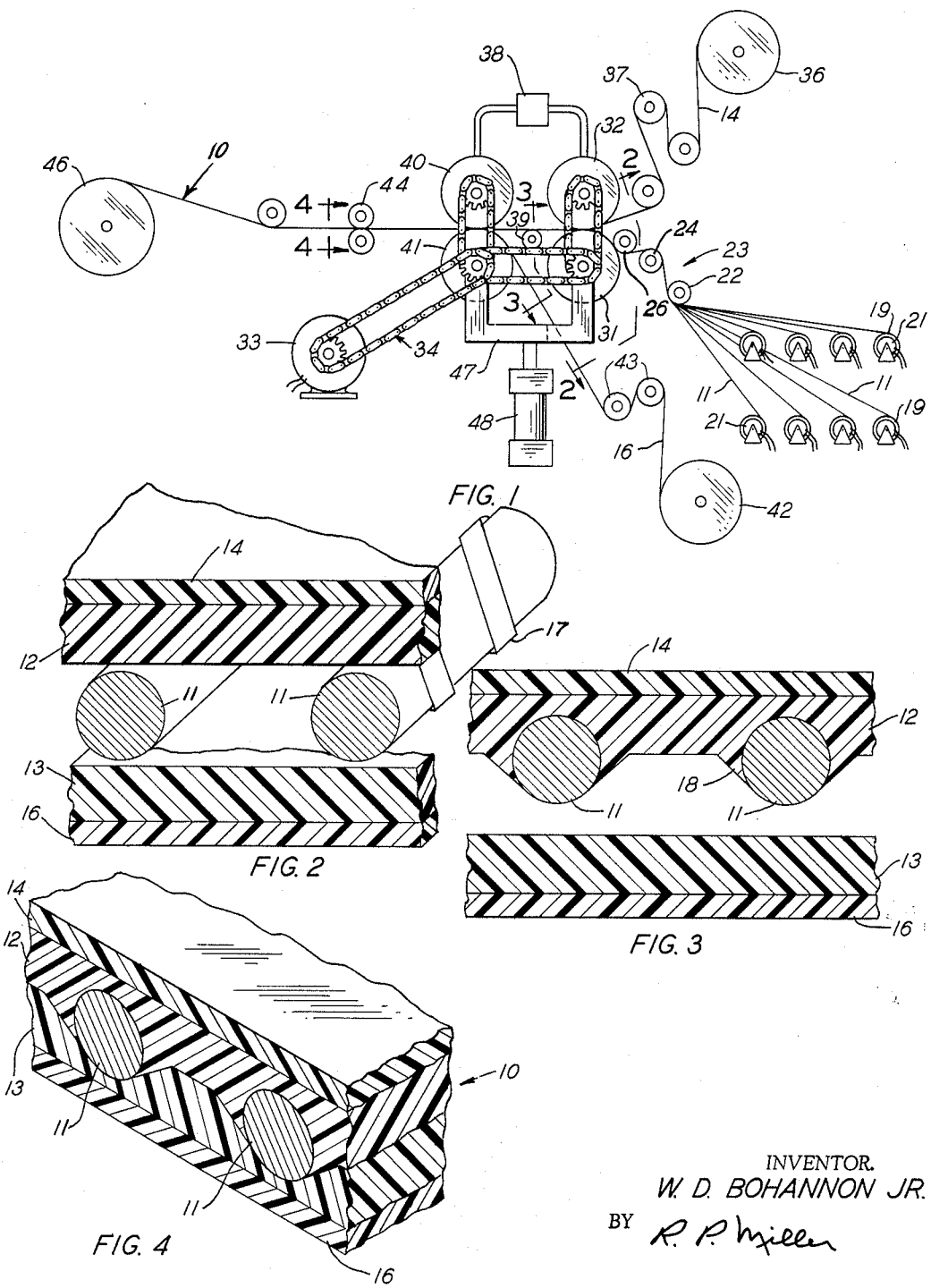
INVENTOR.
W. D. BOHANNON JR.
BY R. P. Miller
ATTORNEY

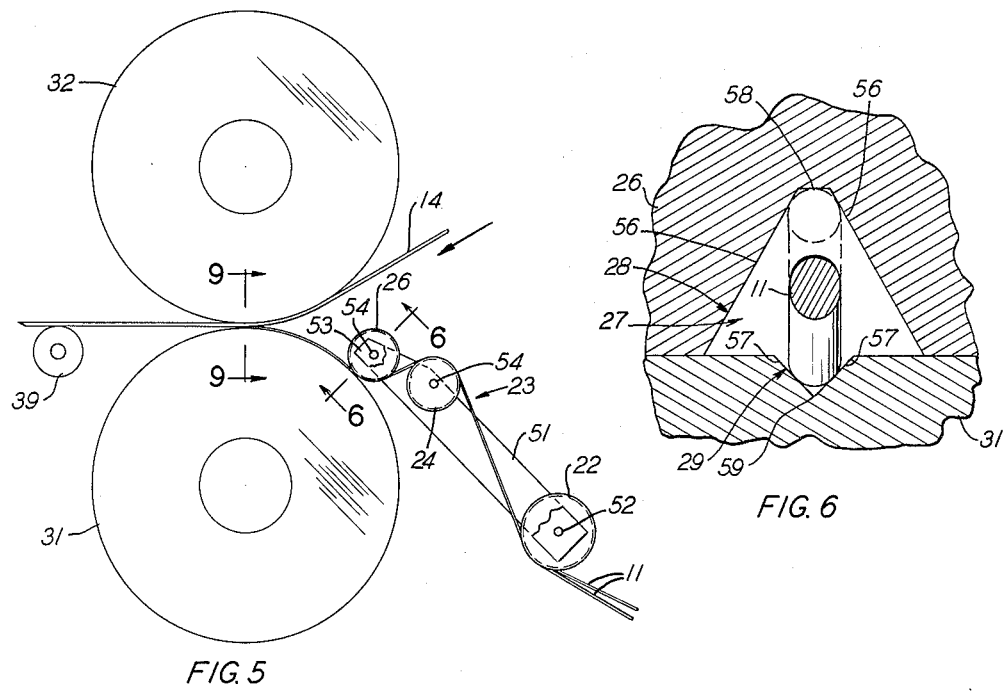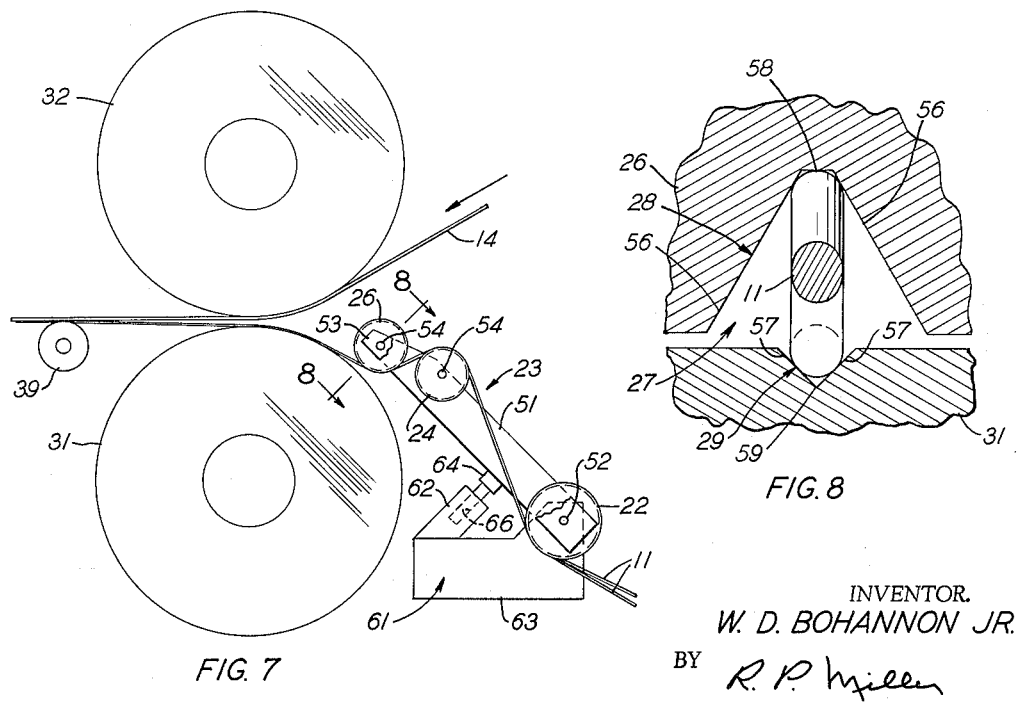

March 8, 1966    W. D. BOHANNON, JR    3,239,396
METHODS OF AND APPARATUS FOR LAMINATING ELONGATED MEMBERS
Filed Feb. 2, 1962    3 Sheets-Sheet 3

INVENTOR.
W. D. BOHANNON JR.
BY
R. P. Miller
ATTORNEY

United States Patent Office 3,239,396
Patented Mar. 8, 1966

3,239,396
METHODS OF AND APPARATUS FOR LAMI-
NATING ELONGATED MEMBERS
William D. Bohannon, Jr., Graham, N.C., assignor to
Western Electric Company, Incorporated, New York,
N.Y., a corporation of New York
Filed Feb. 2, 1962, Ser. No. 170,837
8 Claims. (Cl. 156—52)

This invention relates to methods of and apparatus for laminating elongated members and more particularly to methods of an apparatus for accurately maintaining the lateral spacing of parallel wires while laminating the wires between layers of thermoplastic material formed on sheets of thermosetting material.

In the manufacture of certain articles, it is sometimes necessary to cover a plurality of elongated members with sheets of laminating material. More particularly, in the manufacture of articles such as computer memory modules or twistor cables, it is necessary to laminate precisely spaced twistor wires between sheets of thermoplastic material. In the past, when attempts have been made to laminate a plurality of wires between sheets of laminating material, there has been a problem in accurately maintaining the lateral spacing between the individual wires. This problem was caused in part by the wire guide mechanism which was usually positioned at a distance from the laminating rollers and thus allowed the wires to shift during advance between the laminating rollers.

This problem was also caused by the type of grooves provided in prior laminating rollers wherein the wires were received in and were engaged by the grooves so as to expose less than 180 degrees of the peripheral surface of the wires. This prevented a soft coating of a first laminating sheet from flowing around the wire to cover more than 180 degrees of peripheral surface. Thus, the grooves prevented the coating from gripping or capturing the wires and permitted the wires to advance away from the sheet and move laterally relative to each other.

Research indicates that this problem is eliminated by guiding the wires immediately adjacent to the point of lamination into facilities which engage the wires as two peripheral points to expose greater than 180 degrees of wire surface.

An object of this invention is to provide new and improved methods of and apparatus for laminating elongated members.

Another object of the present invention is to provide methods of and facilities for positioning a plurality of spaced wires between sheets of laminating material wherein the lateral spacing between the wires is accurately maintained.

A further object of the present invention resides in methods of and instrumentalities for engaging each of a plurality of wires at two peripheral points to expose greater than 180 degrees of surface and permit the wires to be embedded in a softened film.

A still further object of the present invention is the provision of facilities for guiding wire immediately adjacent to the point of lamination wherein an instrumentality holds the wire in the guiding facilities at the time of lamination.

With these and other objects in view, the present invention contemplates a method of fabricating cable wherein a first sheet of thermosetting material is heated to soften a thermoplastic coating provided on the sheet. Each of a plurality of strands is then supported at two tangential points to expose greater than 180 degrees of peripheral surface of each strand. The heated sheet is forced against the supported stands to flow the softened coating around the exposed surfaces of the strands and capture the strands. The first sheet is cooled to harden the coating and hold the strands captured whereupon a second sheet is heated to soften a second thermoplastic coating provided thereon. Finally, the second sheet is forced against the captured strand to embed the exposed side of the strands in the second softened coating.

Additionally, with the foregoing objects in view, the present invention contemplates an apparatus for laminating strands between a pair of polyethylene or other thermoplastic coated sheets of thermosetting material. The apparatus includes a mechanism for supplying a plurality of strands to a first laminating roller which is provided with grooves for supporting each strand at two tangential points to expose greater than 180 degrees of peripheral surface of each strand. A pulley rolls on the first laminating roller and is provided with grooves cooperating with the roller grooves to form tunnels for guiding the strands into the roller grooves and precluding lateral shifting of the strands. The first laminating roller and a second laminating roller, arranged to form a calender with the first roller, are rotated to feed the first laminating sheet into the bite of the calender rollers. The first and second rollers are heated to soften a thermoplastic coating provided on the film whereupon the coating flows around the exposed surface of the strands and captures the strands.

A complete understanding of this invention may be had by reference to the following detailed description when read in conjunction with the accompanying drawings illustrating a preferred embodiment thereof wherein:

FIG. 1 is a schematic view of an apparatus for manufacturing laminated cable according to principles of the invention;

FIGS. 2, 3, and 4 are cross-sectional views showing the configuration of the components of the cable during successive steps in a laminating operation;

FIG. 5 is an enlarged side elevational view of a first set of laminating rollers and a mechanism for guiding a plurality of wires into the bite of the rollers;

FIG. 6 is a cross-sectional view taken along line 6—6 of FIG. 5 showing a wire guideway for precluding lateral shifting of the wires during advance into guide grooves formed in the lower laminating roller;

FIGS. 7 and 8 are views similar to FIGS. 5 and 6, respectively, showing an alternate embodiment of the guide mechanism for laminating wires having magnetic tape wrapped thereon:

Figure 9:
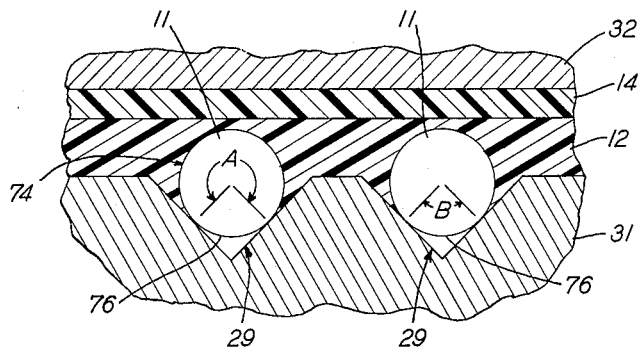
Figure 10:
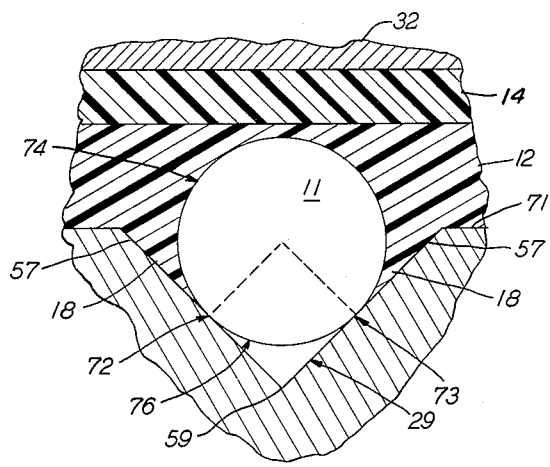

FIG. 9 is a cross-sectional view taken on line 9—9 of FIG. 1 illustrating wires received in a pair of guide grooves during the first step of a laminating operation wherein portions of a softened coating formed on a sheet flow around more than 180 degrees of the sufrace of the wires; and FIG. 10 is an enlarged view of the disclosure of FIG. 9 showing fingers formed by the flowing portions of the coating for capturing and holding the wires in the coating.

Referring first to FIGS. 1 and 4 of the drawings, an article, which may be manufactured according to the method herein described and by the apparatus shown in the other views, is a cable 10 shown including a series of spaced elongated members 11, such as wires, tapes, strands, twistors, etc., which are embedded in thermoplastic coatings or laminae 12 and 13, such as polyethylene, provided respectively on sheets 14 and 16 of thermosetting material such as a Mylar film. When the cable 10 is to be used as a computer memory device, a magnetic tape 17 (FIG. 2) is wrapped in a helical path around each of the wires 11 to form a twistor.

In the method of manufacture of the cable 10, the wrapped wires 11 and the coated sheets 14 and 16 are advanced in separate paths as shown in FIGS. 1 and 2. The wires are then embedded (FIGS. 3 and 10) in the lamina 12 of the upper sheet 14 to form elongated fingers 18 of thermoplastic material which extend around the wires 11 and encompass more than 180 degrees of the peripheral surface of the wires to capture or secure the wires to the upper sheet 14. The captured wires 11 and the upper sheet 14 are then cooled and advanced into contact with the softened coating 13 of the lower sheet 16 to embed the wires 11 in the coating 13 and unite the coatings 12 and 13 of the sheets 14 and 16 to form the cable 10 (FIG. 4).

Attention is again directed to FIG. 1 wherein an apparatus for practicing the method to manufacture the cable 10 is shown including a plurality of spools 19 for feeding wire. Individual torque motors 21 drive each spool against the pull of the laminating apparatus to maintain each wire 11 under constant tension and preclude stretching of the wires. The tensioned wires 11 are advanced around a smooth-surfaced idler pulley 22 of a guide mechanism 23 which maintains the wires in a common plane. The wires 11 advance through a tortuous course defined by two grooved idler pulleys 24 and 26 which laterally gather or direct the wires into accurately spaced parallel relationship in the common plane. The spaced wires 11 advance through a guideway or tunnel 27 (FIG. 6) formed by annular grooves 28 of the pulley 26 and annular grooves 29 formed in a lower laminating roller or drum 31. The pulley 26 urges the wires 11 into the grooves 29 so that the wires 11 are supported and maintained in precise lateral spacing. The spaced wires 11 advance into the bite of a first pair of laminating rollers including the lower laminating roller 31 and a smooth upper laminating roller or drum 32. The laminating rollers 31 and 32 are synchronously driven by a motor 33 and a suitable transmission 34.

The upper or first polyethylene-coated Mylar sheet 14 is advanced from a supply spool 36 around a group of idler pulleys 37 into the bite of the laminating rollers 31 and 32. The laminating rollers 31 and 32 are heated by a suitable device such as a steam system 38. The heated rollers 31 and 32 place the polyethylene coating 12 in a plastic or softened state. The softened polyethylene coating 12 flows into the grooves 29 and forms the elongated fingers 18 (FIG. 10) which capture and secure the wires 11 in the coating 12. The first sheet 14 and the captured wires 11 advance over a lift roller 39 (FIG. 1), which lifts the sheet 14 from the lower laminating roller 31. The first sheet 14 and the wires 11 then advance into the bite of a second pair of smooth-surfaced laminating rollers 40 and 41. The upper laminating roller 40 is maintained by the steam system 38 at a lower temperature than the other rollers 31, 32, and 41 so that the coating 12 of the first sheet is cooled and hardened as it travels between the pairs of laminating rollers.

The fingers 18 which capture the wires 11, are hardened when the coating 12 cools and lock the wires 11 in spaced relationship. The second or lower sheet 16 of polyethylene-coated Mylar film advances from a second supply spool 42 through a series of idler pulleys 43 and between the second pair of laminating rollers 40 and 41. The steam system 38 heats the lower roller 41 which heats the second sheet 16. The polyethylene coating is thereby softened whereupon the locked wires 11 are embedded in the softened polyethylene coating 13 and the sheets 14 and 16 become united to form the cable 10. The cable 10 then advances from the second pair of laminating rollers 40 and 41, cools, and passes through spaced pairs of opposed rotary knives 44 which trim the opposite edges of the cable 10. The cable 10 is then pulled toward and wound on a driven takeup reel 46.

The lower laminating rollers 31 and 41 are mounted for rotation on a support 47 which may be adjusted vertically by a fluid cylinder 48 to permit loading of the laminating apparatus. Thus, the fluid cylinder 48 may be retracted to separate the upper rollers 32 and 40 from the lower rollers 31 and 41. The sheets 14 and 16 and the wires 11 are then threaded around and between the respective pulleys and rollers and attached to the take-up reel. The fluid cylinder 48 is then reversed to advance the rollers into the position shown in FIG. 1. As the laminating operation is commenced, the fluid cylinder 48 may be adjusted to regulate the pressure of the rollers 31 and 41 against the sheets 14 and 16 for controlling the laminating of the cable 10.

Referring to FIGS. 5 and 6, an embodiment of the guide mechanism 23 which may be used, for example, to guide unwrapped wire, strand, etc., is shown including a bifurcated bracket or frame 51 supported on a pivot pin 52. The pivot pin 52 supports the frame 51 and the smooth idler pulley 22 for rotation. Between the free ends 53 of the frame 51, shafts 54, support the grooved idler pulleys 24 and 26 for rotation. The pulleys 22, 24, and 26 are arranged on the frame 51 to define a tortuous path for the wires 11.

The wires 11 advance in the tortuous path under the smooth pulley 22 over the pulley 24, and under the grooved pulley 26. The weight of the pulleys 24 and 26 and the frame 51, in conjunction with the action of the wires 11 advancing in the tortuous path, urge the pulley 24 and thus the frame 51 counterclockwise on the pin 52. The frame 51 urges the idler pulley 26 into rolling engagement with the laminating roller 31. When the pulley 26 engages the laminating roller 31, the walls 56 of the grooves 28 enclose the walls 57 of the grooves 29 and form the guideway 27 immediately adjacent to the bite of the rollers 31 and 32. Because the pulley 26 and the roller 31 are in engagement, the length of a line drawn between the points of tangency of the respective root surfaces 58 and 59 of the grooves 28 and 29 is very short. Therefore, the grooves 28 and 29 are in almost continuous engagement with the wires 11 and thus preclude lateral shifting of the wires. As the wires advance from the pulley 26 to the roller 31, the wires 11 are fully enclosed by the guideway 27 and thus cannot shift out of the grooves 28 and 29.

In manufacturing the cable 10 wherein the magnetic tape 17 is wrapped in a helical path on the wires 11, the electrical characteristics of the wires may be impaired if the wrapped wires are subjected to sliding, as distinguished from rolling contact. Accordingly, the speed of the peripheral surface of the idler pulleys 22, 24, and 26 must equal the lineal speed of the wires 11. Thus, when the diameter of the pulley 26 is less than the diameter of the roller 31, the pulley 26 and the roller 31 must be maintained out of engagement. The embodiment of the guide mechanism shown in FIGS. 7 and 8 may be used with wrapped wire 11 and is similar to that shown in FIGS. 5 and 6 with the exception of a stop device 61 which maintains the pulley 26 and roller 31 out of engagement.

The stop device 61 includes a projection 62 that extends from a base 63 toward the frame 51. A threaded stop member or screw 64 is threaded into a tapped aperture 66 provided in the projection 62. When the frame 51 rotates counterclockwise under the action of the advancing wires 11, the frame 51 engages the stop member 64. The stop member 64 may be adjusted so that the frame 51 engages the member 64 just before the idler pulley 26 engages the roller 31 to maintain the pulley 26 spaced from the roller 31. This spacing permits the pulley 26 to rotate at a peripheral speed that is equal to the lineal speed of the wire 11. Thus, there is a rolling, rather than sliding contact between the pulley and the wire whereby the electrical characteristics of the wire 11 will not be impaired. Although the roller 31 and pulley 26 are not in engagement, the grooves 28 and 29 are still very closely spaced and still form the guideway 27. The grooves 28 and 29 and the guideway 27 are thus still effective to preclude lateral shifting of the wires 11.

Appreciation of a detailed description of the laminating operation may be had upon reference to FIGS. 9 and 10, where the annular roller grooves 29 are shown positioned at precise lateral spacings and having shallow V-shaped configurations. The V-shaped grooves 29 are designed to position the center line of the wire 11 even with or slightly below the surface 71 of the roller, depending upon minor variations in wire diameter. Because of this shallow configuration of the grooves 29, the grooves are effective to apply a limited amount of lateral guiding force to the wires 11. In both embodiments of the guide mechanisms 23, however, the pulley 26 positively guides and urges the wires into the grooves 29 at a point that is immediately adjacent to the bite of the rollers 31 and 32 whereby the wire 11 is maintained under tension between the pulley 26 and the bite of the rollers. With the wires 11 thus positively urged and guided into the grooves 29, the limited lateral support of the grooves 29 is sufficient to preclude lateral shifting and thus maintain precise spacing between wires 11 during the lamination operation.

Still referring to FIGS. 9 and 10, the wires 11 are shown urged by the idler pulley 26 into engagement with two points 72 and 73 of the V-shaped grooves 29 so that peripheral surfaces 74 having an angle A, which is substantially greater than 180 degrees, are exposed. The wires 11 advance with the lower laminating roller 31 into the bite of the laminating rollers 31 and 32 with the surface 74 exposed. The upper sheet 14, with the polyethylene coating 12 softened by the heated rollers 31 and 32 is advanced into the bite of the rollers at the same time. The softened polyethylene 12 flows around the exposed surfaces 74 of the wires 11 and into the grooves 29 to the points 72 and 73. The portions of the polyethylene coating 12 that have flowed into the grooves 29 form the fingers 18 which capture the wires 11 and embed the wires in the coating 12.

As the wires 11 and the sheet 14 emerges from the bite of the rollers 31 and 32, the fingers 18 hold the wires 11 within the coating 12. The wires 11 advance from the grooves 29 to expose surfaces 76 (having a peripheral surface angle B) that were previously covered by the grooves.

The wires 11 then advance between the bite of the second pair of laminating rollers 40 and 41 where the upper roller 40, which is maintained at a temperature less than the other rollers 31, 32, and 41, cools the upper sheet 14 to harden the coating 12 and the fingers 18. The hardened fingers 18 lock or maintain the wires captured and preclude relative lateral movement between the wires. The second sheet 16, having a coating 13 of polyethylene softened by the roller 41, is also advanced into the bite of the second pair of rollers 40 and 41. The fingers 18 and a second or the remaining exposed surface 76 of the wires 11 are embedded in the coating 13 whereupon the coated surfaces of the sheets 14 and 16 become united to form the cable 10.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A method of embedding a strand in a thermoplastic lamina formed on a film which comprises the steps of heating the film to soften the lamina, engaging the strand at two tangential points to support the strand during embedding and expose greater than 180 degrees of peripheral surface thereof, and advancing the engaged strand into the softened lamina to flow the lamina around the exposed peripheral surface of the strand and capture the strand in the lamina.

2. A method of fabricating a cable having a strand embedded in thermoplastic coatings provided on sheets of thermosetting material which comprises the steps of heating a first of said coated sheets to soften the coating, supporting a strand at two tangential points to expose greater than 180 degrees of peripheral surface of the strand, forcing the first sheet against the supported strand to flow the softened coating around the exposed surface and capture the strand, cooling the first sheet to harden the first coating and hold the stand captured in the first coating, subsequently heating a second of said sheets to soften the coating, and forcing the second sheet against the captured strand and the cooled coating to embed and interlock the strand in the second softened coating.

3. A method of fabricating a cable having strands locked at predetermined laterally spaced positions by thermoplastic coatings provided on a pair of laminating films, which comprises the steps of heating a first of said films to soften the coating, supporting each of the strands in said predetermined position at two tangential points to expose a peripheral surface of greater than 180 degrees, pressing the first film and the supported strands together to flow the softened coating around the exposed surfaces and capture the strands in said predetermined positions, cooling the first film to harden the coating and lock the captured strands, heating a second of the films to soften the coating, and forcing the second film against the locked strands and the first film to embed the strands in the second coating and unite the laminating films.

4. A method of laminating strands between a pair of thermosetting sheets, each having a thermoplastic lamina thereon which comprises the steps of heating a first of said sheets to soften the lamina, supporting each strand at two tangential points during laminating to expose a first surface of the strand including greater than 180 degrees of peripheral surface while precluding access to the remainder of the peripheral surface including less than 180 degrees, advancing the supported strands into the softened lamina to flow the laminate material around the first surfaces and capture the strands, heating a second sheet to soften the lamina, moving the first sheet and the captured strands to expose the remainder of the strand surfaces, and forcing the softened lamina of the second sheet against the last mentioned surfaces and the first sheet to embed the strands in the second lamina and join the lamina of the pair of sheets.

5. In an apparatus for embedding a wire in a thermoplastic coating formed on a sheet of thermosetting material, a first laminating roller having a groove for supporting the wire at two points during embedding to expose a peripheral surface of each wire of greater than 180 degrees, a pulley rolling on the roller and having a groove forming a tunnel with the roller groove for precluding lateral shifting of the wire out of the roller groove, a second laminating roller mounted to from a calendar with the first roller, means for rotating the rollers to feed said sheet and the wire into the bit of the rollers, and means for heating the rollers to soften and flow the thermoplastic coating around the exposed surface of the wire and capture the wire in the coating.

6. In an apparatus for embedding a plurality of wires in a thermoplastic lamina formed on a sheet of thermosetting material, a calender including a first drum and a second drum provided with grooves for maintaining said wires in spaced relationship and for supporting the wire at two points during embedding to expose a peripheral surface of greater than 180°, a roller having guide grooves for holding the wires in the drum grooves, a frame for mounting the roller for movement into a position immediately adjacent to the bite of the calender drums to worm a tunnel with the drum and roller grooves, means for supplying a plurality of wires around the roller and into the bite of the drums, means actuated by the supplied wire for advancing the frame to move the roller into said position, means for feeding said sheet into the bite of the calender drums, and means for heating the drums to soften and flow the lamina around the wires in the drum grooves.

7. In an apparatus for embedding a pair of spaced wires in a coating of thermoplastic material formed on a thermosetting sheet; a laminating drum having grooves for engaging each wire at two points during embedding to expose a peripherial surface thereof greater than 180 degrees; a bracket mounted for movement toward the drum; a group of idler pulleys mounted for rotation on the bracket; means for advancing the wires under a first pulley, over a second pulley and over the drum to pivot the bracket toward the drum; a roller interposed between said second pulley and the drum and urged toward the drum by the movement of the bracket; said roller having grooves forming a tunnel with said drum grooves for guiding the wires advancing over the second pulley into the drum grooves; means for limiting movement of the bracket to position the roller slightly out of engagement with the drum for forming said tunnel with said roller and drum grooves; means for supplying said sheet onto the drum; and means for heating the drum to soften the coating and flow the material around the exposed surfaces of the wires.

8. In a mechanism for embedding a strand in a sheet of thermoplastic material, a drum having a first groove for laterally positioning the strand and for supporting the wire at two points during embedding to expose a peripheral surface of each wire of greater than 180°, a movable frame, a first idler pulley having a groove forming a tunnel with said first drum groove for holding the strand in the drum groove, a second idler pulley having a groove for directing the strand into said first idler pulley groove, means for mounting the first and second pulleys for rotation on the frame, means for feeding a strand around the first and second pulleys in a tortuous path to move said frame and davance the first pulley toward the drum, means for limiting movement of the frame to preclude contact between said first pulley and the drum while forming the tunnel to preclude lateral movement of the strand out of the first groove, means for heating the drum to soften the material, and means for advancing the sheet onto the drum in close proximity to the tunnel to flow the softened material around the strand and embed the strand in the sheet.

References Cited by the Examiner
UNITED STATES PATENTS

| | | | |
|---|---|---|---|
| 1,742,777 | 1/1930 | Midgley | 156—437 XR |
| 2,758,630 | 8/1956 | Hodge | 156—178 XR |
| 2,767,113 | 10/1956 | Bower | 156—176 XR |
| 2,810,670 | 10/1957 | Gonsett | 156—52 |
| 3,017,302 | 1/1962 | Hultkrans | 154—43 |
| 3,068,135 | 12/1962 | Bower | 156—436 XR |
| 3,082,292 | 3/1963 | Gore | 156—55 XR |

EARL M. BERGERT, *Primary Examiner.*